(12) United States Patent
Fujikawa

(10) Patent No.: US 7,674,051 B2
(45) Date of Patent: Mar. 9, 2010

(54) MIRROR ANGLE ADJUSTMENT MECHANISM

(75) Inventor: Naoki Fujikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 636 days.

(21) Appl. No.: 11/526,399

(22) Filed: Sep. 25, 2006

(65) Prior Publication Data

US 2007/0091489 A1    Apr. 26, 2007

(30) Foreign Application Priority Data

Oct. 20, 2005   (JP)   ............................. 2005-306149

(51) Int. Cl.
*G03B 19/12* (2006.01)
*G03B 17/00* (2006.01)

(52) U.S. Cl. .................. 396/354; 396/358; 396/447

(58) Field of Classification Search .................. 396/352, 396/356, 358, 447, 354; 359/872, 876; 354/136, 354/405

See application file for complete search history.

(56) References Cited

U.S. PATENT DOCUMENTS

| 4,103,311 | A  | * | 7/1978  | Horigome       | 396/378 |
| 6,003,999 | A  | * | 12/1999 | Kitaoka et al. | 359/872 |
| 6,183,142 | B1 | * | 2/2001  | Sakamoto et al.| 396/358 |

FOREIGN PATENT DOCUMENTS

JP    2004-240281    8/2004

* cited by examiner

*Primary Examiner*—Melissa J Koval
(74) *Attorney, Agent, or Firm*—Straub & Pokotylo; John C. Pokotylo

(57) ABSTRACT

A mirror adjustment mechanism including a first reflection mirror rotatable around a rotation shaft, and a second reflection mirror rotatably provided on the first reflection mirror. One of the ends of the rotation shaft of the first mirror is allowed to move in the direction of the surface of the first mirror. By this movement, it is possible to adjust the direction of the reflecting light on the second mirror without substantially affecting the direction of the reflecting light on the first mirror. For example, the present invention can be applied to the adjustment of a sub-mirror rotatably mounted on a main mirror of a single-lens reflex camera.

16 Claims, 13 Drawing Sheets

MIRROR ANGLE ADJUSTMENT MECHANISM

CROSS-REFERENCE TO RELATED APPLICATION

This application is based upon and claims the benefit of priority from prior Japanese Patent Application No. 2005-306149, filed Oct. 20, 2005, the entire contents of which are incorporated herein by reference.

BACKGROUND OF THE INVENTION

1. Field of the Invention

The present invention relates to a mirror angle adjustment mechanism for a mirror mechanism including a position-adjustable reflection mirror.

2. Description of the Related Art

A mirror mechanism, applied to a single-lens reflex camera, and including a subject image viewing main mirror and a distance measurement sub-mirror rotatably supported by the main mirror, requires fine adjustment of the angle between the main mirror and the sub-mirror when the two mirrors are incorporated into a camera. A mirror support mechanism for a camera disclosed in Japanese Unexamined Patent Publication No. 2004-240281 is capable of performing fine adjustment of the position (angle) of a main mirror and the position (angle) of a sub-mirror by adjusting the position of an adjustment plate mounted on a mirror box by a jig.

In the mirror support mechanism disclosed in the above-mentioned Japanese Unexamined Patent Publication No. 2004-240281, when the position of the adjustment plate with respect to the mirror box is arbitrarily changed, the angles of the main mirror and the sub-mirror change at the same time. Therefore, the angles of the two mirrors need to be adjusted at the same time.

BRIEF SUMMARY OF THE INVENTION

A mirror adjustment mechanism, according to the present invention, includes a first reflection mirror rotatable around a rotation shaft, and a second reflection mirror rotatably provided on the first reflection mirror, wherein one of ends of the rotation shaft of the first mirror is allowed to move in the direction of the surface of the first mirror. By this movement, it is possible to adjust the direction of the reflected light of the second mirror without substantially affecting the direction of the reflected light of the first mirror.

An example of the mirror adjustment mechanism according to the present invention includes: a rotation shaft; a fixation member for supporting one end of the rotation shaft; an adjustment member for movably supporting the other end of the rotation shaft; a first reflection mirror which is a plane mirror movable between a first position and a second position different from the first position by rotation around the rotation shaft; a second reflection mirror rotatably provided on the first reflection mirror; and a guide mechanism allowing the adjustment member to move in a direction of a surface of the first reflection mirror with respect to the fixation member in order to adjust an angle of the second reflection mirror when the first reflection mirror is in the first position.

According to the present invention, a mirror angle adjustment mechanism including at least two reflection mirrors, in which adjustment of the angle of each mirror can be easily performed.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
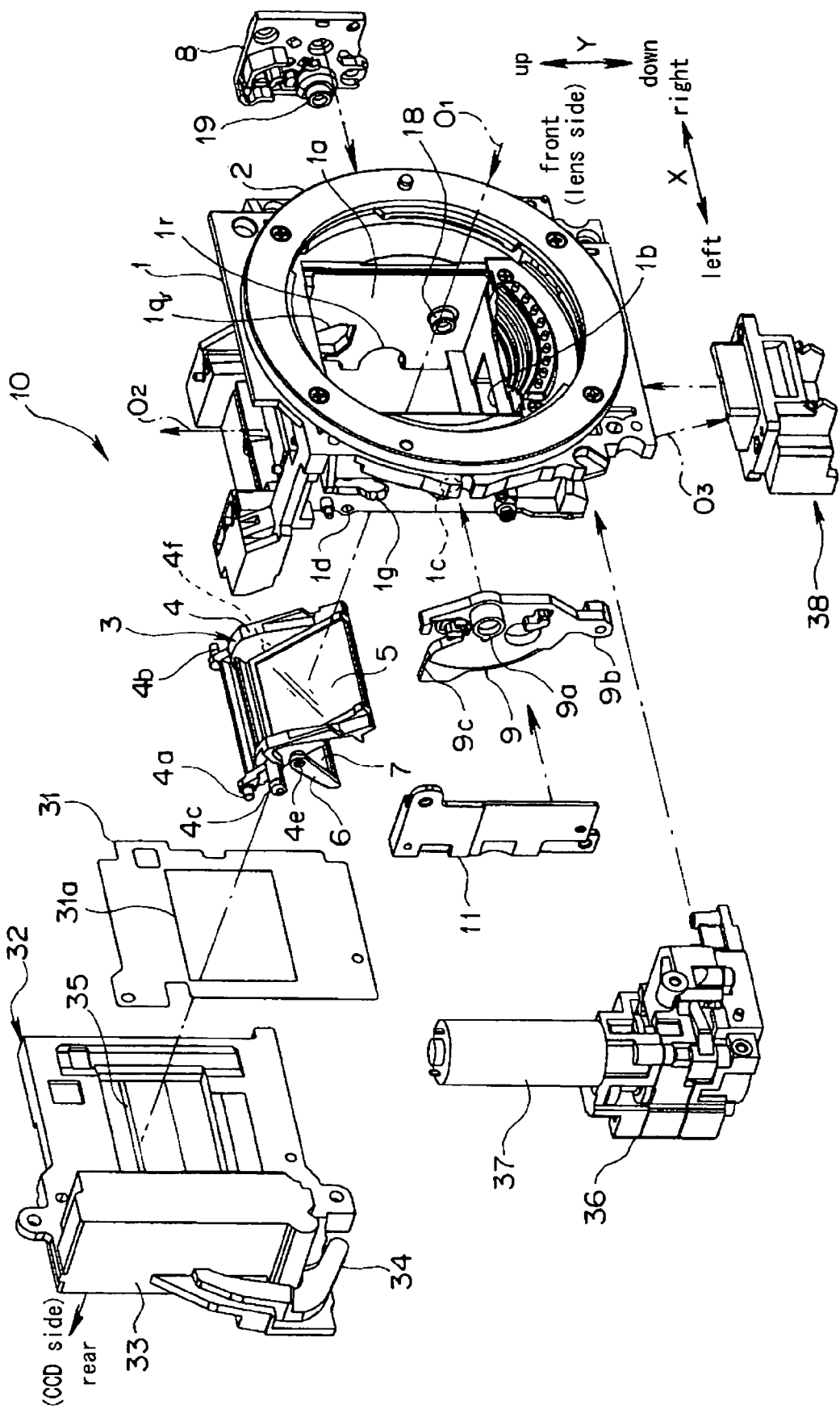
FIG. 1 is an exploded perspective view, seen from the left side, of a mirror mechanism for a single-lens reflex camera including a mirror angle adjustment mechanism according to the first embodiment of the present invention.
Figure 2:
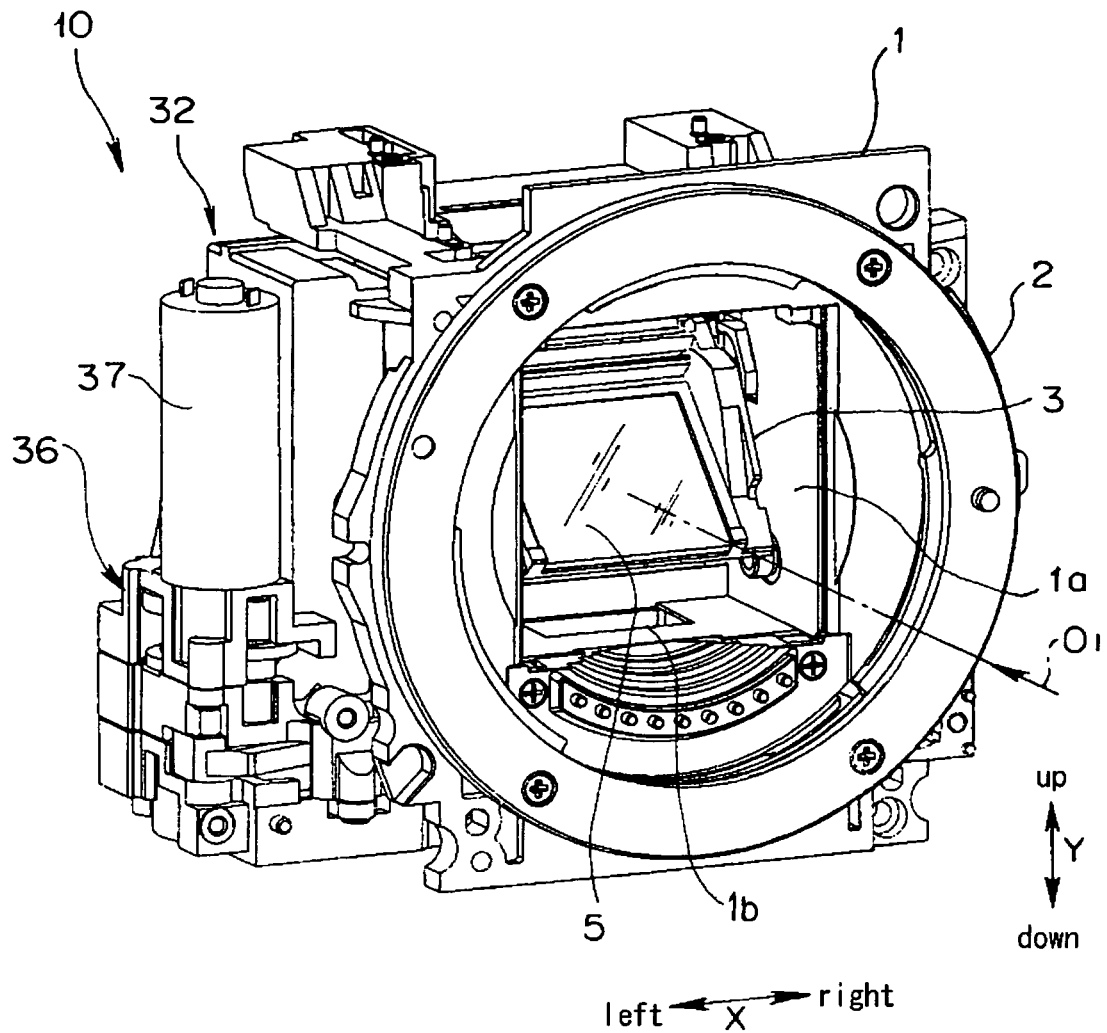
FIG. 2 is a perspective view, seen from the front side (mount side), of the mirror mechanism of FIG. 1.

A mirror mechanism 10 according to this embodiment of the present invention is applied to a single-lens reflex camera, and includes a mirror angle adjustment mechanism. As shown in FIG. 1, the mirror mechanism 10 includes a mirror box 1, a mirror unit 3, a mirror adjustment plate 8, a mirror charge lever 9, a mirror charge lever lid 11, a shutter unit 32, a charge driving unit 36, and an AF unit 38.

The mirror box 1 is a fixation member having a center opening 1a. The mirror unit 3 is arranged in the center opening 1a, as a member to be assembled inside the mirror box 1. The mirror adjustment plate 8 is an adjustment member for adjusting the position of the mirror unit 3. The mirror charge lever 9 charges and drives the mirror unit 3. The mirror charge lever lid 11 covers the mirror charge lever 9. The shutter unit 32 controls exposure of a CCD, which is an image pickup device. The charge driving unit 36 charges and drives a shutter charge lever 34 of the shutter unit 32 and the mirror charge lever 9. The AF unit 38 measures the distance of a subject.

Meanwhile, the above-described mirror angle adjustment mechanism is incorporated in the mirror box 1, and mainly comprises the mirror unit 3, and the mirror adjustment plate 8.

The mirror box 1 is fixed to and supported in a camera body (not shown) which is an exterior member of a single-lens reflex digital camera, and includes a photographing optical axis O1 which passes through the center opening 1a of the mirror box 1 and matches an optical axis of a lens barrel mounted on the front portion of the mirror box 1.

Incidentally, in the explanation, the left-right direction, which is parallel to an axis orthogonal to the photographing optical axis O1 is decided as the X direction. The left and right directions are defined in accordance with the left and right directions seen from the lens barrel side. Also, the up-down direction, which is parallel to an axis orthogonal to the photographing optical axis O1 is decided as the Y direction. Along the optical axis O1, the side of the lens barrel is set to be the front side, and the side of a CCD (described later), as an image pickup device, is set to be the rear side. Also, an optical axis which is orthogonal to the photographing optical axis O1 and is directed upward from the center of a main mirror 5 (described later) is set to be a viewing optical axis O2. Furthermore, an optical axis, which crosses the photographing optical axis O1, and extends downward from the center of a sub-mirror 7 (described later) with the inclination at a predetermined angle is set to be a distance measurement optical axis O3.

Figure 18:
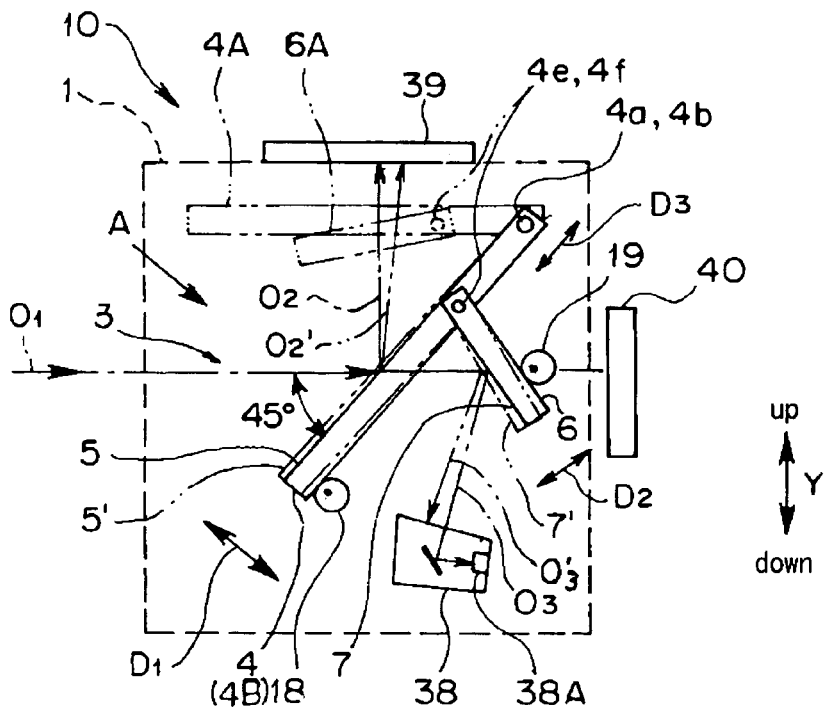
FIG. 18 is a diagrammatic side view showing switching of angles of the main mirror and the sub-mirror of the mirror mechanism.

On the front portion of the center opening 1a of the mirror box 1, a ring-shaped body mount 2 for mounting the lens barrel (not shown) is fixedly provided. A focus plate 39 is arranged on the top of the mirror box 1 on the viewing optical axis O2 (FIG. 18). Also, a CCD 40 is positioned and mounted on the photographing optical axis O1 behind the back side of the shutter unit 32 located rear of the mirror box 1 (the opposite side of the body mount 2) (FIG. 18). Furthermore, the AF unit 38 is arranged on the distance measurement optical axis O3 in the lower part of a lower opening 1b of the mirror box 1.

The shutter unit 32 is a unit mounted on the rear (on the back side) of the mirror box 1. The shutter unit 32 includes a shutter blade 35, a shutter control portion 33, a shutter charge lever 34, and a shutter mask 31. The shutter control portion 33 controls and drives the shutter blade 35 to open and close. The shutter charge lever 34 charges the shutter control portion 33.

The shutter mask 31 is arranged on and adhered to the front of the shutter unit, and includes an opening 31a.

The charge driving unit 36 includes a driving motor 37, a driving force transferring gear train (not shown), and a driving cam portion (not shown). The driving motor 37 is driven in time with a photographing (photo-shooting) timing, to rotationally drive the shutter charge lever 34 and the mirror charge lever 9, and the shutter unit 32 and the mirror unit 3 are charged.

The AF unit 38 is mounted on the lower portion of the mirror box 1 and includes a distance measurement optical system (not shown) with the distance measurement optical axis O3 and a distance measurement sensor 38A in inside thereof. The measurement sensor 38A is a sensor which is capable of measuring a distance with a plurality of measurement points with respect to a subject.

The mirror unit 3 includes the main mirror 5 as a first reflection mirror, which is a main reflection mirror of a finder optical system, and the sub-mirror 7 as a second reflection mirror, which is a sub-reflection mirror for distance measurement. The main mirror 5 is adhered to and secured by a main mirror frame 4 which is rotatably supported by the mirror box 1. The sub-mirror 7 is adhered to and secured by a sub-mirror frame 6 which is supported by the main mirror frame 4 and is rotatable relative to the main mirror frame 4r.

The main mirror 5 is driven for rotation between a mirror down position as a first position, and a mirror up position as a second position. The first position is a predetermined position for reflecting a photographing light beam traveling along the photographing optical axis O1 to the focus plate 39 along the viewing optical axis O2, and also is corresponding to a viewing position for viewing through the finder. The second position is a retraction position retracted from the optical path of the photographing light beam. When the main mirror 5 is in the viewing position (the first position), the sub-mirror 7 is in a distance measurement position, in which a part of the photographing light beam passed through the main mirror 5 is reflected on the sub-mirror 7 to the AF unit 38 along the distance measurement optical axis O3, as a distance measurement light beam. Also, when the main mirror 5 is in the retraction position (the second position), the sub-mirror 7 is in a folded position, in which the sub-mirror 7, along with the main mirror 5, is retracted from the photographing optical axis O1. The sub-mirror 7 moves by rotation between the distance measurement position and the folded position in accordance with the movements of the main mirror 5.

Figure 8:
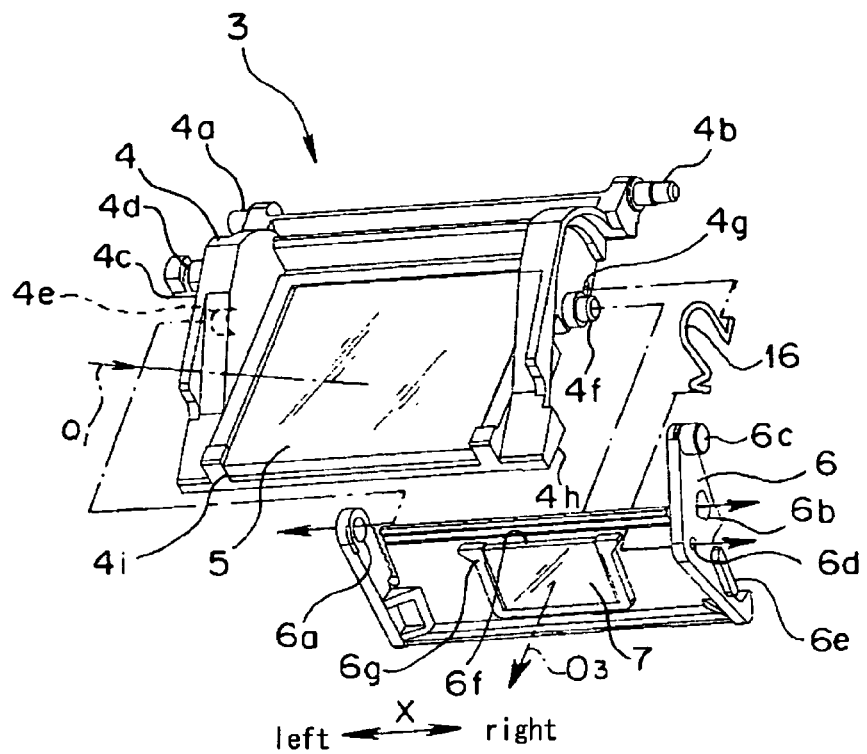
FIG. 8 is an exploded perspective view, seen from the right front side, of the mirror unit of the mirror mechanism of FIG. 1.
Figure 9:
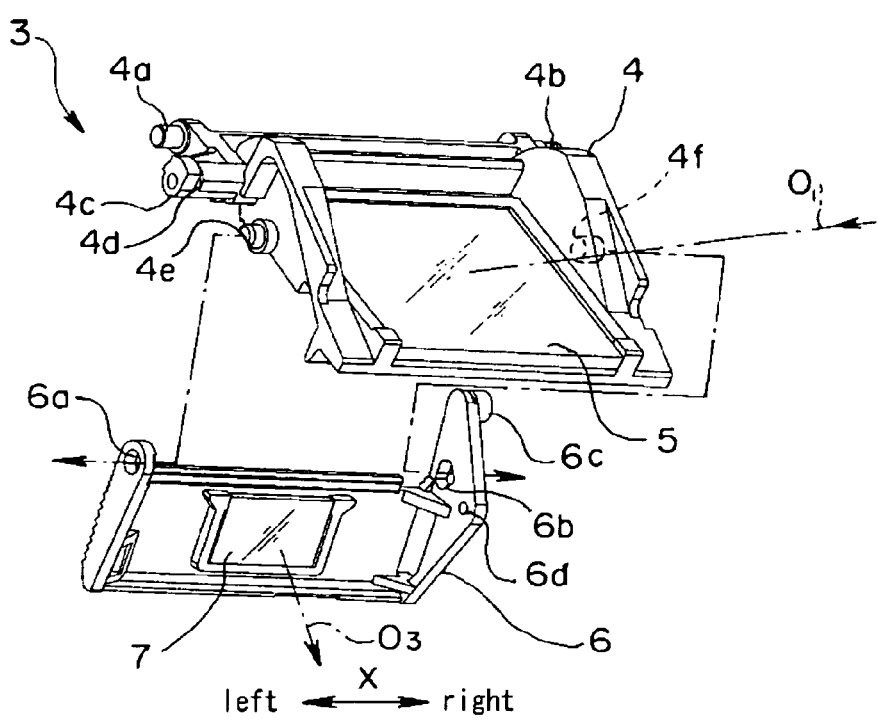
FIG. 9 is an exploded perspective view, seen from the left front side, of the mirror unit of FIG. 8.

As shown in FIGS. 8 and 9, the main mirror frame 4 includes a flat concave portion 4i, rotation shaft portions (rotation shaft) 4a and 4b, a projection 4c, and sub-mirror supporting shaft portions 4e and 4f. The main mirror 5 is adhered to the concave portion 4i. The rotation shaft portions 4a and 4b are a pair of shaft ends; the rotation shaft portion (the rotation shaft) 4a projects at the left end (one end), and the rotation shaft portion (the rotation shaft) 4b projects at the right end (the other end). In this instance, the center axis of the rotation shaft portions 4a and 4b is located on a surface almost along the reflection surface of the main mirror 5. The projection 4c projects at a position near the rotation shaft portion 4a, and has a groove 4d. The sub-mirror supporting shaft portions 4e and 4f are a pair of rotation shaft portions project on the side surfaces near the concave portion 4i at positions parallel to the rotation shaft portions 4a and 4b.

The center portion of the main mirror 5 corresponding to the distance measurement area is formed of a half mirror, and a part of the photographing light beam passes through to the side of the sub-mirror 7 as a distance measurement light beam.

As shown in FIGS. 8 and 9, the sub-mirror frame 6 has a flat concave portion 6f, axial holes (bearing portions) 6a and 6b, and a projection 6c. The sub-mirror 7 is adhered to the concave portion 6f, and surrounded by a rib 6g. The axial holes 6a and 6b are a pair of rotation portions, and are provided in the left and right side surfaces. The projection 6c projects on the opposite side of the axial hole 6b from the sub-mirror 7. The center of the axial holes 6a and 6b are positioned almost in the extension of the reflection surface of the sub-mirror 7. A sub-mirror spring 16, which is a U-shaped spring for fixing the sub-mirror frame 6, is placed between the main mirror frame 4 and the sub-mirror frame 6.

The sub-mirror frame 6 is assembled such that the sub-mirror supporting shaft portions 4e and 4f of the main mirror frame 4 are inserted into the axial holes 6a and 6b of the sub-mirror frame 6, while elastically deforming the sub-mirror frame 6 so as to spread the distance between side walls of the sub-mirror frame 6, and the sub-mirror frame 6 is rotatably supported by the main mirror frame 4.

Figure 10:
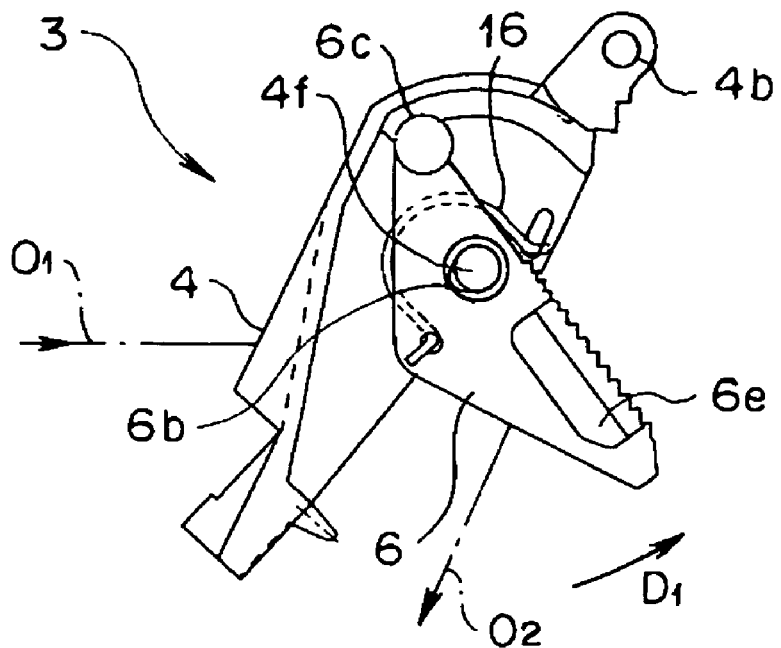
FIG. 10 is a right side view of the mirror mechanism of FIG. 8 in the viewing position.

Furthermore, the sub-mirror spring 16 is attached in such a way that the sub-mirror spring 16 is inserted around the outer periphery of the sub-mirror supporting shaft 4f on the right side of the main mirror frame 4, one hook end of the sub-mirror spring 16 engages with a spring hole 4g of the main mirror frame 4, and the other hook end engages with a spring hole 6b of the sub-mirror frame 6. The acting direction of the rotational urging force of the sub-mirror spring 16 switches depending on the rotational position of the sub-mirror frame 6. In other words, as shown in FIGS. 10 and 18, when the mirror unit 3 is in the finder viewing state (the main mirror 5 is in the viewing position 4B on the photographing optical path), the urging force acts in such a direction that the sub-mirror 6 is opened with respect to the main mirror frame 4 (the urging force acts in the counterclockwise direction in FIG. 10). When the mirror unit 3 is in the photographing state (the main mirror 5 is in the retracted position 4A retracted from the photographing optical path), the urging force acts in such a direction that the sub-mirror 6 is folded with respect to the main mirror frame 4 (the urging force acts in the clockwise direction in FIG. 10).

The sub-mirror supporting shaft portions 4e and 4f provided on the main mirror frame 4 are formed as shaft ends with a circular cross-section. Also, the axial hole 6a provided on the left side of the sub-mirror frame 6 is a circular hole, and the sub-mirror support shaft portion 4e is rotatably fitted in the axial hole 6a. Furthermore, the axial hole 6b provided on the right side of the sub-mirror frame 6 comprises a V-shaped portion and an arc hole portion, and the sub-mirror supporting shaft portion 4f which receives the urging force of the sub-mirror spring 16 contacts the V-shaped portion and supported thereby.

Figure 13:
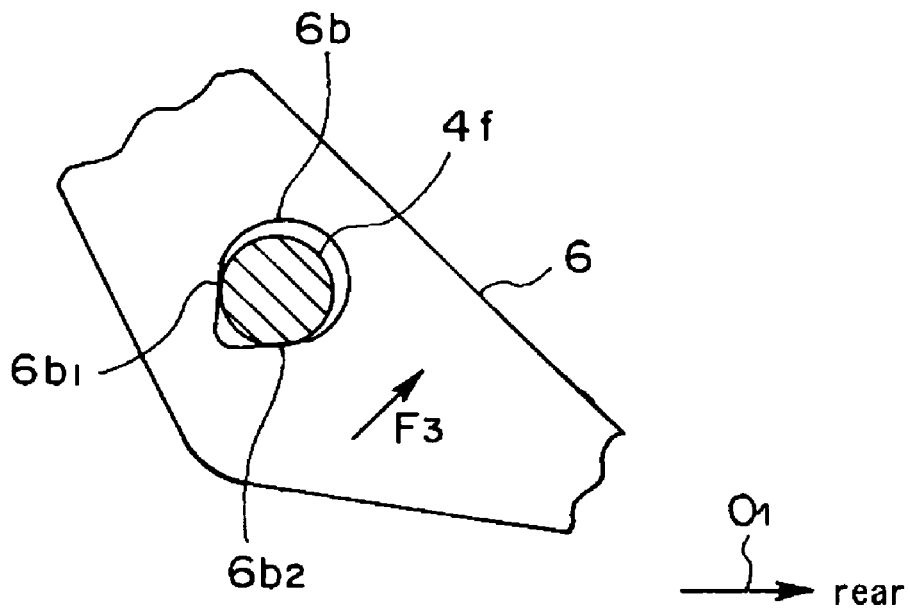
FIG. 13 is a view showing a state in which the support shaft portion of the main mirror frame of the mirror unit of FIG. 8 is fitted in the axial hole and contacts the V-shaped portion.

FIG. 13 shows a state in which the sub-mirror supporting shaft portion 4f is fitted in the axial hole 6b, and contacts the V-shaped portion. When the mirror unit 3 is in the viewing state (FIGS. 10 and 18), the sub-mirror supporting shaft portion 4f securely contacts two different points 6b1 and 6b2 of the V-shaped portion of the axial hole 6b under the urging force F3 of the sub-mirror spring 16. By contacting the sub-mirror supporting 4f in this manner, the sub-mirror frame 6 is rotatably supported without any gap, and kept in the inclined position relative to the main mirror frame 4, with a good repeat accuracy.

Figure 3:
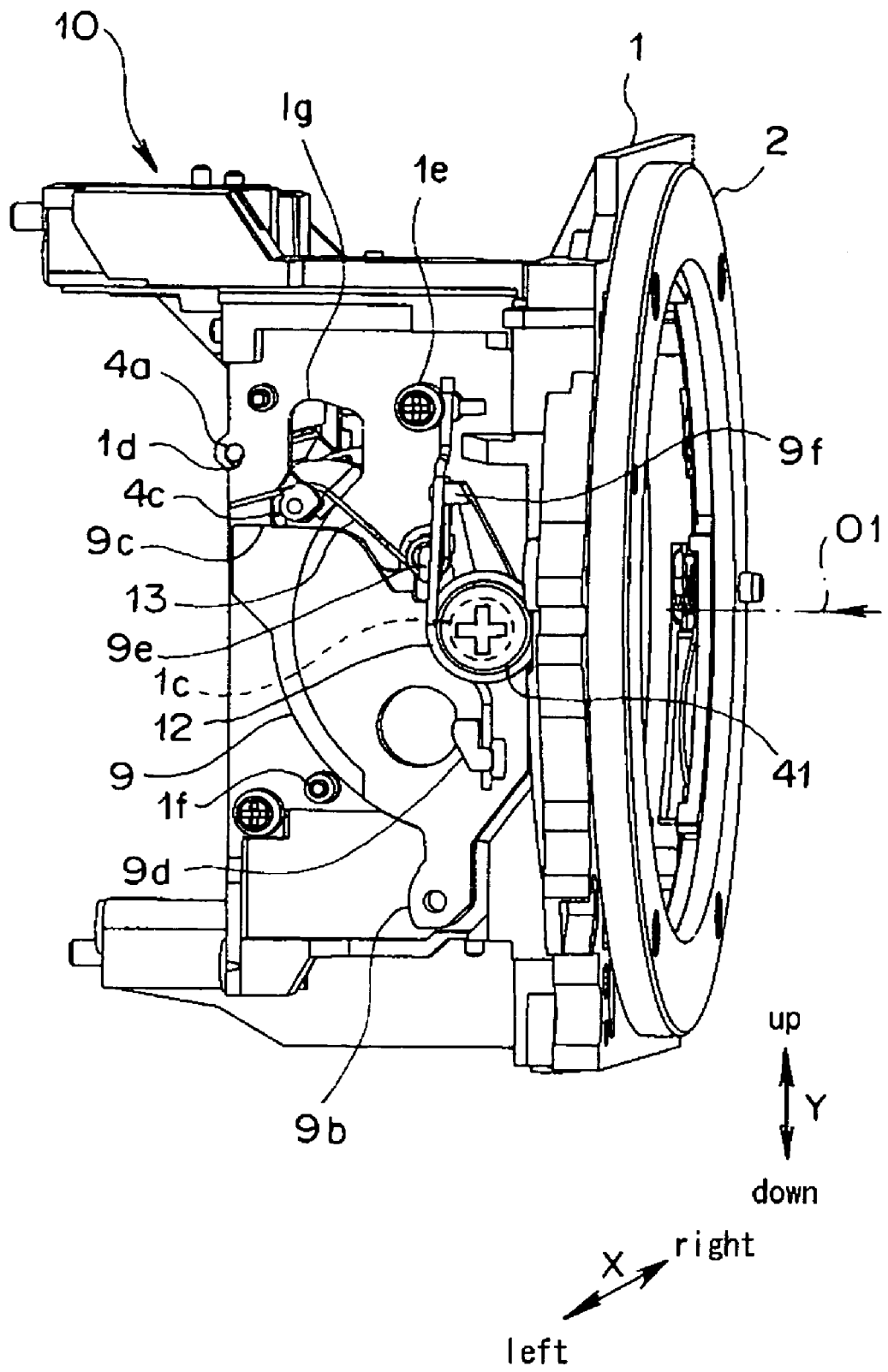
FIG. 3 is a perspective view, seen from the left side (mirror charge lever side), of the mirror mechanism of FIG. 1.
Figure 4:
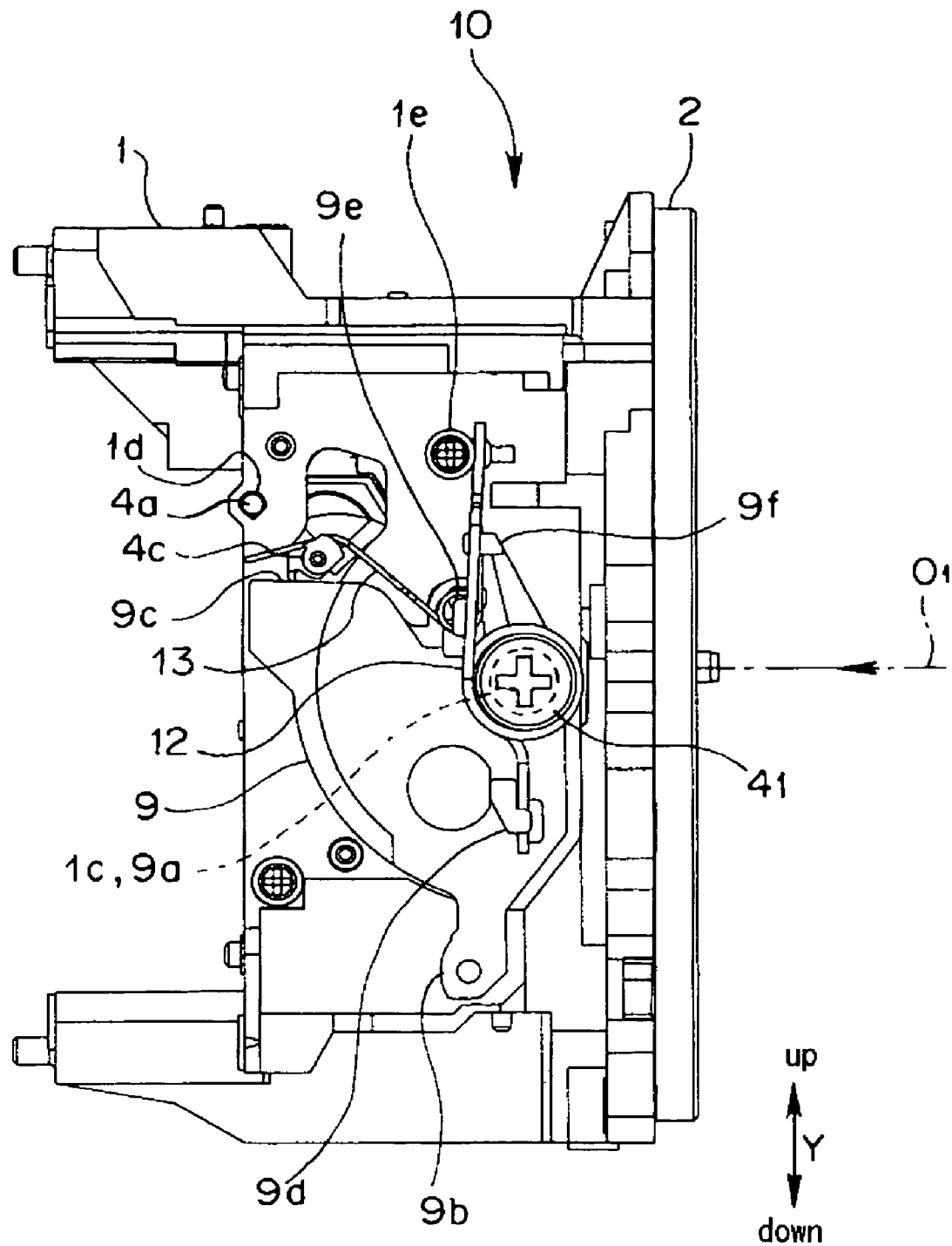
FIG. 4 is a left side view of the mirror mechanism of FIG. 1.

The mirror charge lever 9 is a rotatable member, and is mounted on the left outer wall of the mirror box 1 (FIGS. 3 and 4). The mirror charge lever 9 includes an axial hole 9a, a driven end portion 9b, a mirror charge driving surface 9c, spring hanging portions 9d and 9f, and a projecting spring-support portion 9e.

A boss portion 1c, an axial hole 1d, an opening 1g, a spring hanging projection 1e and a stopper 1f are provided on the left outer wall of the mirror box 1, on which the mirror charge lever 9 is mounted. The axial hole 9a is rotatably fitted over the center portion of the boss portion 1c. The axial hole 1d is provided in the upper portion, and serves as a second bearing supporting the rotation shaft portion 4a of the main mirror frame 4. The opening 1g allows the projection 4c of the main mirror frame 4 to project to the outside of the wall close to the axial hole 1d. The stopper 1f is in the lower portion, and decides the charge position of the mirror charge lever 9.

The boss portion 1c is rotatably fitted in the axial hole 9a of the mirror charge lever 9, and secured by a screw 41. Several turns of a coil portion of a mirror-up spring 12 is wound around the outer circumference of the boss portion of the axial hole 9a of the mirror charge lever 9. One end of the mirror-up spring 12 is hanged on the spring hanging projection portion 1e, and the other end is hanged on the spring hanging portion 9d. The mirror charge lever 9 is urged by the mirror-up spring 12 in the clockwise (with respect to the view point of in FIG. 4), and under that urging force, the main mirror frame 4 is urged to the counterclockwise (with respect to the view point of FIG. 4) in the mirror-up direction.

Several turns of a coil portion of a mirror-down spring 13, which is the second spring, is wound around the spring-support portion 9e of the mirror charge lever 9. One end of the mirror-down spring 13 is hanged on the spring hanging portion 9f, and the other end is hanged on the groove 4d provided inside of the projection 4c of the main mirror frame 4, thereby the mirror-down spring 13 urges the main mirror frame 4 to the clockwise (with respect to the view point of FIG. 4) in the mirror-down direction.

The rotational urging force of the mirror-up spring 12 against the mirror charge lever 9 is larger than the rotational urging force of the mirror-down spring 13, and therefore, when the charge force of the mirror charge lever is released, this urging force is enough to drive the main mirror frame 4 of the mirror unit 3 to rotate from the viewing position to retraction position.

When the main mirror frame 4 is in the mirror-up position, if the mirror charge lever 9 is pressed via the driving cam portion of the charge driving unit 36, the mirror charge lever 9 is driven to rotate to the counterclockwise (with respect to the view point of FIG. 4). The urging force of the mirror-down spring 13 drives the main mirror frame 4 to rotate to the clockwise (with respect to the view point of FIG. 4) to the mirror-down position.

Also, when the main mirror frame 4 is in the mirror-down position, if the driving cam portion retracts from the urging position, the mirror charge lever 9 is rotated to the clockwise (with respect to the view point of FIG. 4) by the pressing force of the mirror-up spring 12. Then, the mirror charge driving surface 9c presses the projection 4c of the main mirror frame 4, and the main mirror frame 4 is rotated to the mirror-up position.

Figure 5:
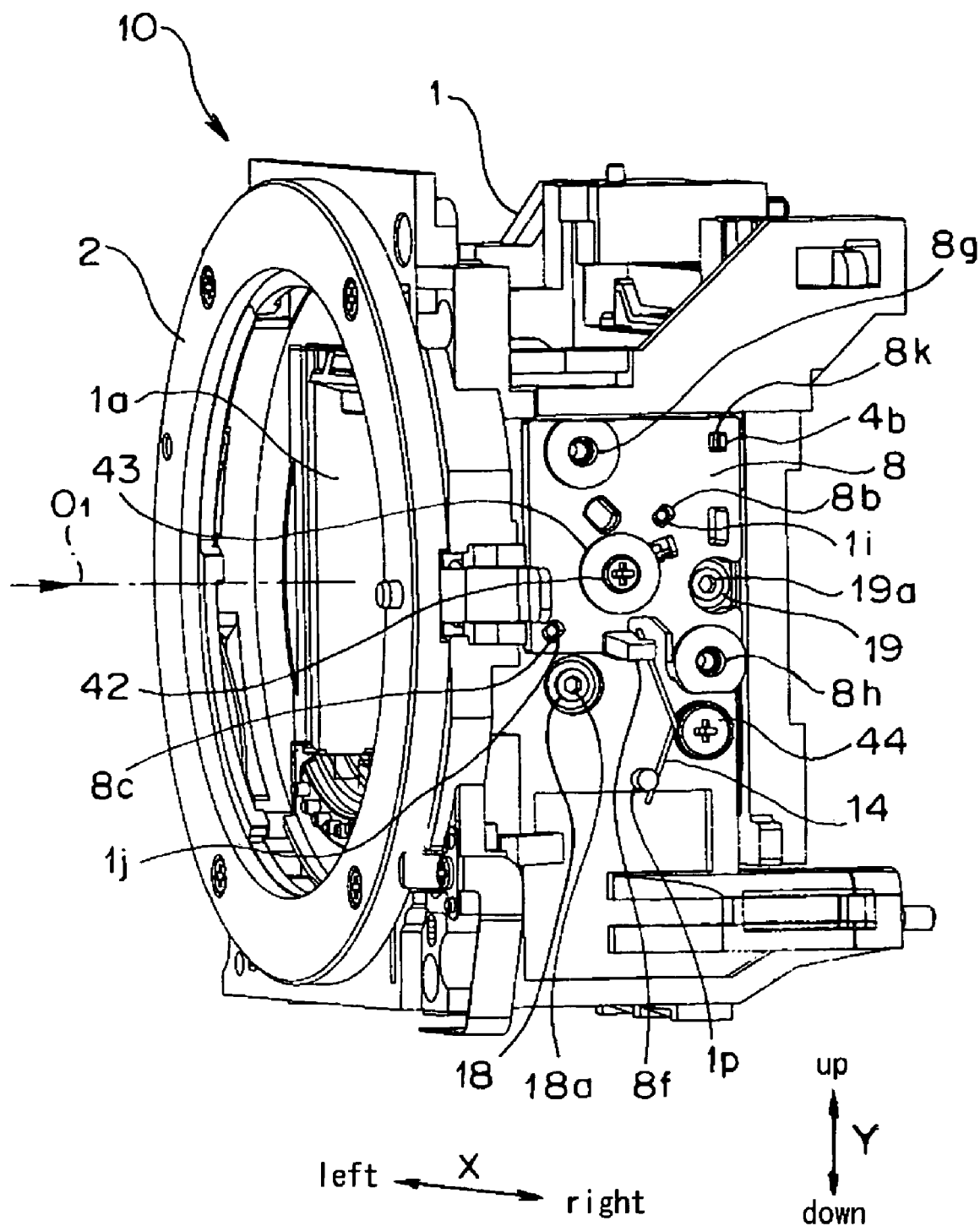
FIG. 5 is a perspective view, seen from the right side (mirror adjustment plate side), of the mirror mechanism of FIG. 1.
Figure 6:
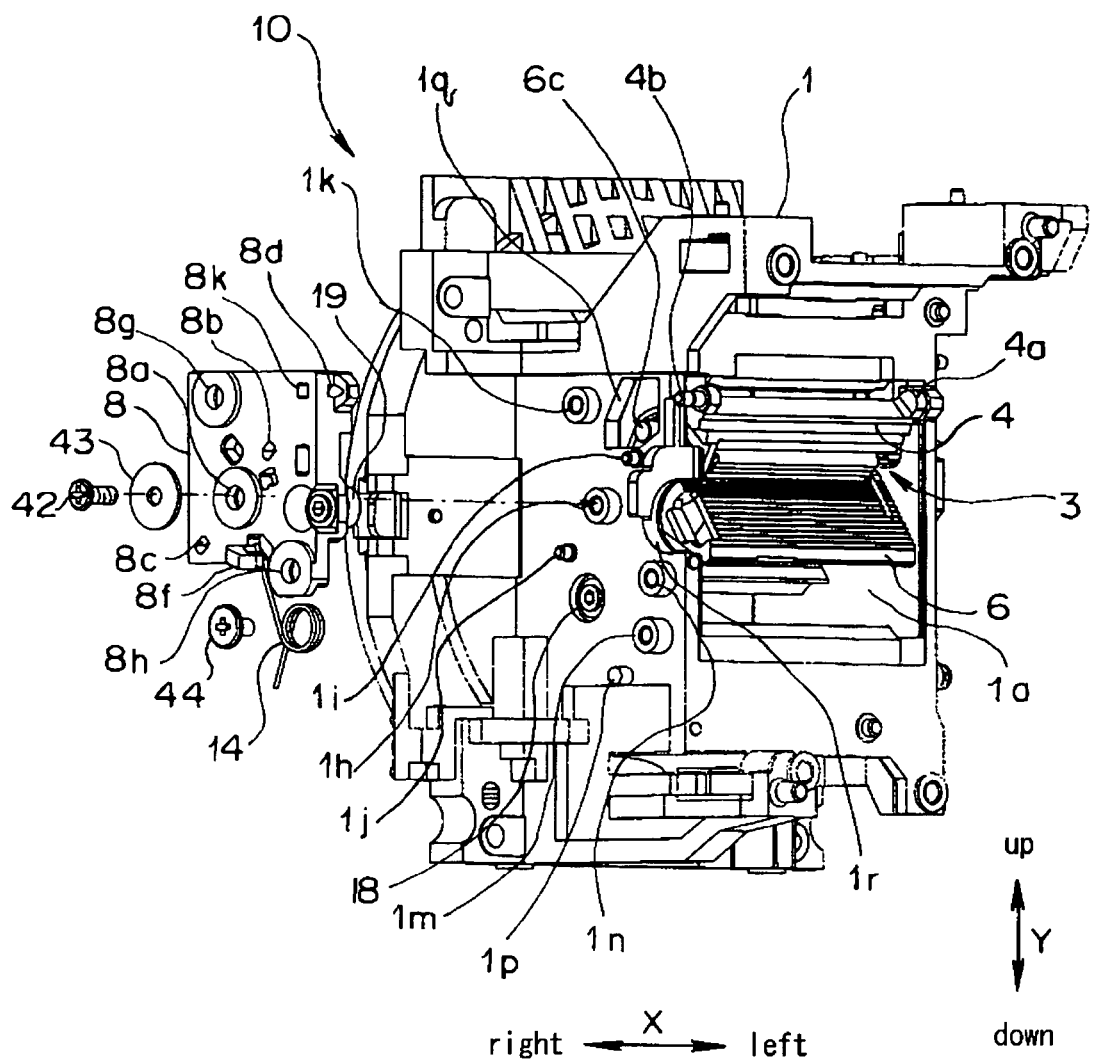
FIG. 6 is an exploded perspective view, seen from the right back side (mirror adjustment plate side) of the mirror mechanism of FIG. 1, with the mirror adjustment plate removed.
Figure 7:
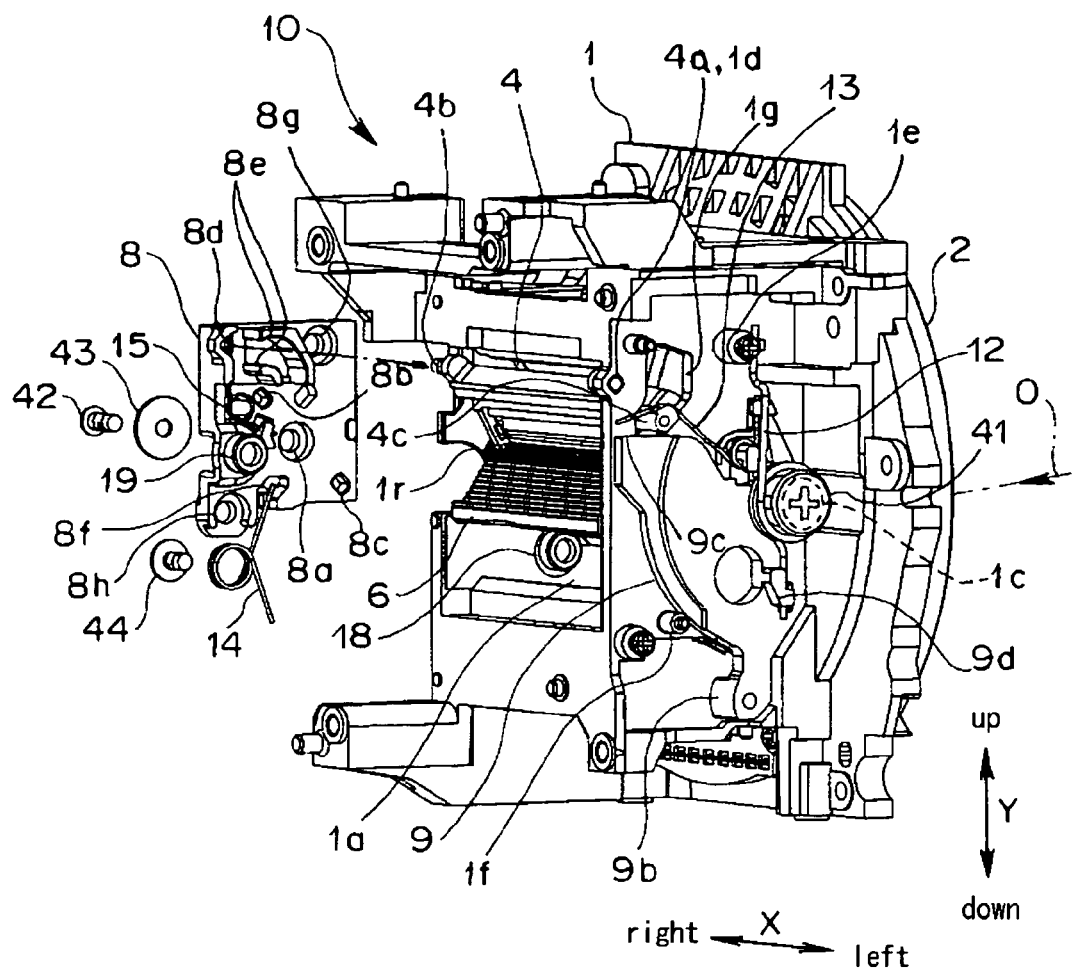
FIG. 7 is an exploded perspective view, seen from the left back side (mirror adjustment plate side), of the mirror mechanism of FIG. 1, with the mirror adjustment plate removed.
Figure 11:
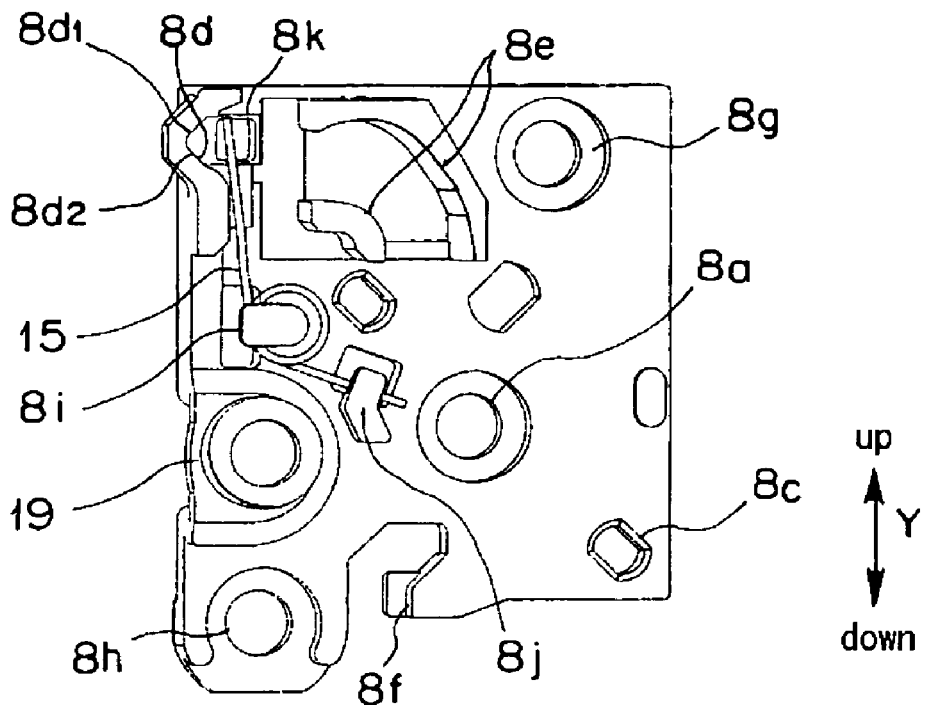
FIG. 11 is a perspective view, seen from the back inside, of the mirror adjustment plate of the mirror mechanism of FIG. 1.
Figure 12:
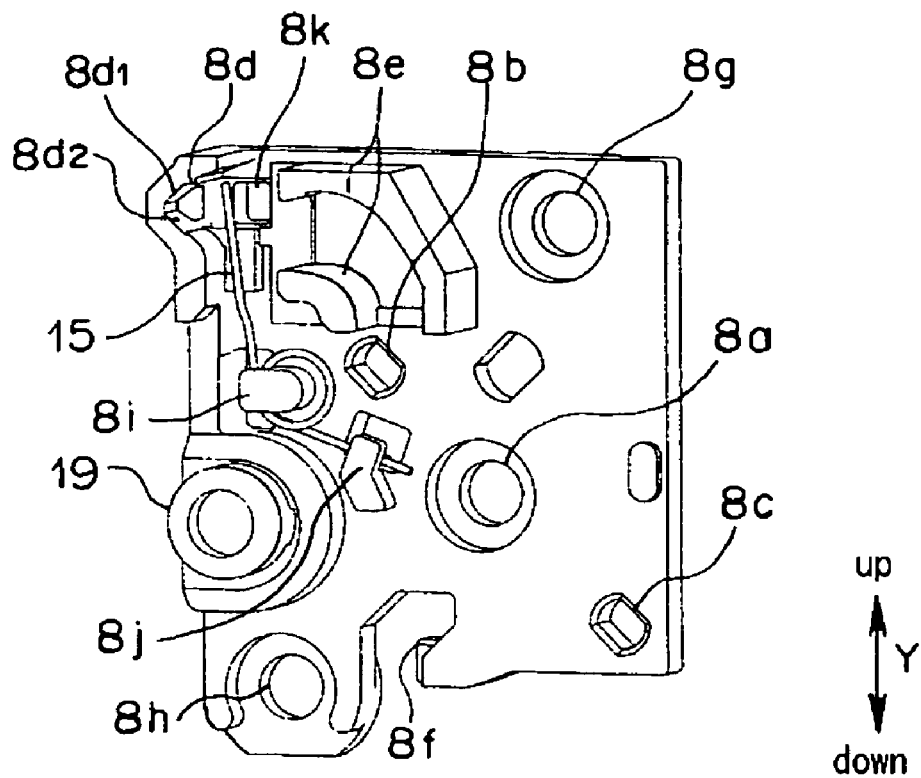
FIG. 12 is a perspective view, seen from the front inside, of the mirror adjustment plate of the mirror mechanism of FIG. 1.

The mirror adjustment plate 8 is a plate-like member, and is mounted on the right outer wall of the mirror box 1 (FIGS. 5 and 6). The mirror adjustment plate 8 includes a fixing-screw insertion through-hole 8a provided in the center thereof, two adjustment guide holes 8b and 8c as guide means, which are elongated holes, two sub-fixing-screw insertion through-holes 8g and 8h, a spring hanging portion 8f, and a small opening 8k. The inner surface, on the side of the right outer wall of the mirror box 1, has a V-shaped groove 8d as a first bearing, a sub-mirror frame driving cam portion 8e, which is formed by two projection portions facing each other, a spring support projection 8i, and a spring hanging portion 8j are provided. Also, a sub-mirror adjustment pin 19 as a second reflection mirror abutting member is mounted on this inner side, with an eccentric pin portion projecting (FIGS. 11 and 12).

On the other hand, the right outer wall of the mirror box 1, on which the mirror adjustment plate 8 is mounted, has a boss portion including a screw hole 1h corresponding to the screw insertion through-hole 8a, two guide pins 1i and 1j as guide means for slidably inserting into the adjustment guide holes 8b and 8c, and boss portions including screw holes 1k and 1n corresponding to the sub-fixing screw insertion through-holes 8g and 8h. Furthermore, a projecting spring-support portion 1m, a spring hanging portion 1p, an opening 1q for inserting the cam portion 8e, a notch portion 1r for retraction of the sub-mirror adjustment pin 19 are provided. Also, a main mirror adjustment pin 18 as a first reflection mirror abutting member is mounted in a state where an eccentric pin portion projects to the inner side of the mirror box (FIG. 6).

The two guide pins 1i and 1j are arranged along the reflection surface of the main mirror 5, that is, with the inclination of 45 degrees to the photographing optical axis O1 (the front is lower than the rear). The center of the bearing of the V-shaped groove 8d for the mirror adjustment plate 8 is located at the upper-rear portion of the extension of the connecting line between the adjustment guide holes 8b and 8c.

One rotation shaft portion 4b with a circular cross-section of the main mirror frame 4 is inserted into the V-shaped groove 8d. One hook portion of a shaft pressing spring 15 as a first spring inserted into the spring support projection portion 8j, is hanged on the spring hanging portion 8j, and the other hook portion presses the rotation shaft portion 4b to the backward, so the rotation shaft portion 4b is maintained in the state of contacting the V-shaped groove 8d.

In this instance, the small opening 8k is arranged adjacent to the front side of the V-shaped groove 8d, and a pin-like tool can be inserted from the small opening 8k, so the hook portion of the shaft pressing spring 15 can be securely hanged on the rotation shaft portion 4b, and also this can be confirmed.

Figure 14:
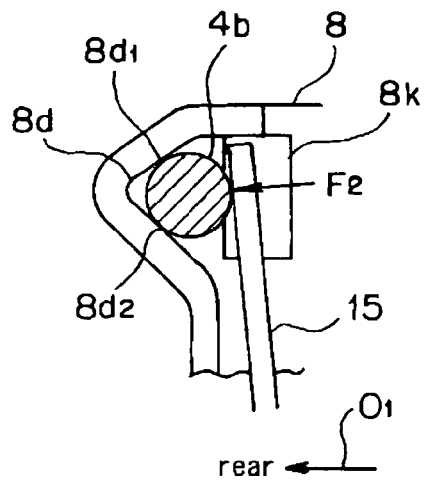
FIG. 14 is a view showing a state in which one rotation shaft portion of the main mirror frame of the mirror unit of FIG. 8 is supported by the V-shaped groove of the mirror adjustment plate.

FIG. 14 shows a state that the rotation shaft portion 4b is supported by the V-shaped groove 8d. The rotation shaft portion 4b receives the pressing force F2 of the shaft pressing spring 15 to the backward, and two points on the circumference of the rotation shaft portion 4b contact two points 8d1 and 8d2 of the V-shape portion of the V-shaped groove 8d to be supported thereby. Therefore, the rotation shaft portion 4b is rotatably supported, without any gap, and the main mirror frame 4 is supported in the inclined position with a good repeat accuracy. In this instance, generally, when a circular shaft is rotatably fitted in a bearing portion with a circular cross-section, or a U-shaped bearing, there is a possibility that the relative engagement position of the circular shaft to the bearing portion slightly changes by the amount of the gap in the direction orthogonal to the force affecting the circular shaft, because of the slight change of the magnitude of the force, or the direction of the force. Therefore, the repeat accuracy of the above-mentioned relative engagement position is not always good.

The other rotation shaft portion 4a of the main mirror frame 4 is inserted into the shaft hole 1d arranged at the upper portion close to the back side on the left outside wall of the mirror box 1.

Figure 15:
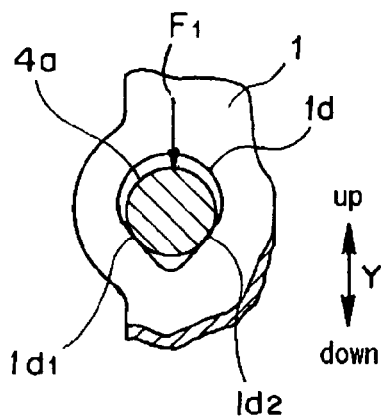
FIG. 15 is a view showing a state in which the other rotation shaft portion of the main mirror frame of the mirror unit of FIG. 8 is supported by an axial hole of the mirror adjustment plate.

FIG. 15 shows a state where the rotation shaft portion 4a is supported by the axial hole 1d. The rotation shaft portion 4a has a circular cross-section, and the axial hole 1d comprises a V-shaped portion and an arc hole portion. The rotation shaft portion 4a receives force F1 by the mirror-down spring 13 via the projection portion 4c in downward direction, and two points on the circumference of the rotation shaft portion 4a contact the different two points 1d1 and 1d2 of the V-shaped portion to be supported thereby. Therefore, the rotation shaft portion 4a is rotatably supported, without gap, and the main mirror frame 4 is supported in the inclined position with a good repeat accuracy.

In the mirror unit 3, in order to adjust the inclination of the left and the right of the sub-mirror frame 6 (the sub-mirror 7), that is, the inclination component of the left and right direction of the distance measurement optical axis O3, the mirror adjustment plate 8 is moved along the guide pins 1i and 1j to adjust the position thereof, in a state where the rotation shaft portions 4a and 4b of the main mirror frame 4 is supported (that is, one rotation shaft portion 4a is rotatably supported by the mirror box 1, and the other rotation shaft portion 4b is supported by the mirror adjustment plate 8 which is movable to adjust the position thereof). Then, the rotation shaft portion 4b moves along the direction of the guide pins 1i and 1j (direction of the main mirror reflection surface), and it is possible to adjust the right and left component of the inclination of the reflection surface of the sub-mirror 7 on the sub-mirror frame 6, almost without changing the inclination of the reflection surface of the main mirror 5 to the photographing optical axis O1. The details of this adjustment will be described later with reference to FIGS. 17 to 19.

The hook portion of an adjustment plate urging spring 14 mounted by the screw 44 screwed into the spring portion 1m (refer to FIG. 6) is put into the spring hanging portion 8f of the mirror adjustment plate 8 (refer to FIG. 5). Thereby, the mirror adjustment plate 8 receives urging force to oblique downward direction deviated from the line of the guide pins 1i and 1j of the mirror box 1. Therefore, when the position of the rotation shaft portion 4b is adjusted, it is possible to adjust the position of the rotation shaft portion 4b, by moving the mirror adjustment plate 8 against the urging force of the spring, and possible to adjust the position easily and accurately without any gap in the adjustment guide holes 8b and 8c of the mirror adjustment plate 8 with respect to the guide pins 1i and 1j.

Figure 16:
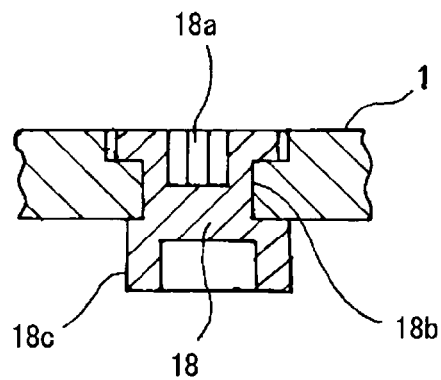
FIG. 16 is a cross-sectional view of the main mirror adjustment pin used for the mirror mechanism of FIG. 1.

As shown in the cross-sectional view of FIG. 16, the head portion 18c of the main mirror adjustment pin 18 is eccentric to the stem portion 18b, and the stem portion 18b is fitted in the right side wall of the mirror box 1 to be rotatably mounted by caulking, with the head portion 18c, as the eccentric pin portion, projecting inward of the mirror box. A hexagonal hole 18a is provided in the caulking side of the shaft portion of the adjustment pin 18, and the adjustment pin 18 is rotated by the rotation movement given by the hexagonal holes 18a. The rear abutting portion 4h (FIG. 8) of the main mirror frame 4 contacts the circumference of the head portion 18c of the adjustment pin 18 (FIG. 18). Therefore, the inclination of the main mirror frame 4 is adjusted by the rotational position of the adjustment pin 18.

The sub-mirror adjustment pin 19 has the same eccentric pin structure as the main mirror adjustment pin 18, and is rotatably mounted by caulking in a state that the shaft portion is mounted with the head portion as the eccentric pin portion projecting inward of the mirror adjustment plate 8. Also, a hexagonal hole 19a is provided on the caulking side of the shaft portion (FIG. 5). The adjustment pin 19 is rotated by the movement given by the hexagonal hole 19a. Also, the rear abutting portion 6e (FIG. 8) of the sub-mirror frame 6 contacts the circumference of the head portion of the adjustment pin 19 (FIG. 18). Therefore, the inclination of the sub-mirror frame 6 is adjusted by the rotation position of the adjustment pin 19. The mirror adjustment method by using these adjustment pins 18 and 19 will be described later in detail.

Figure 19:
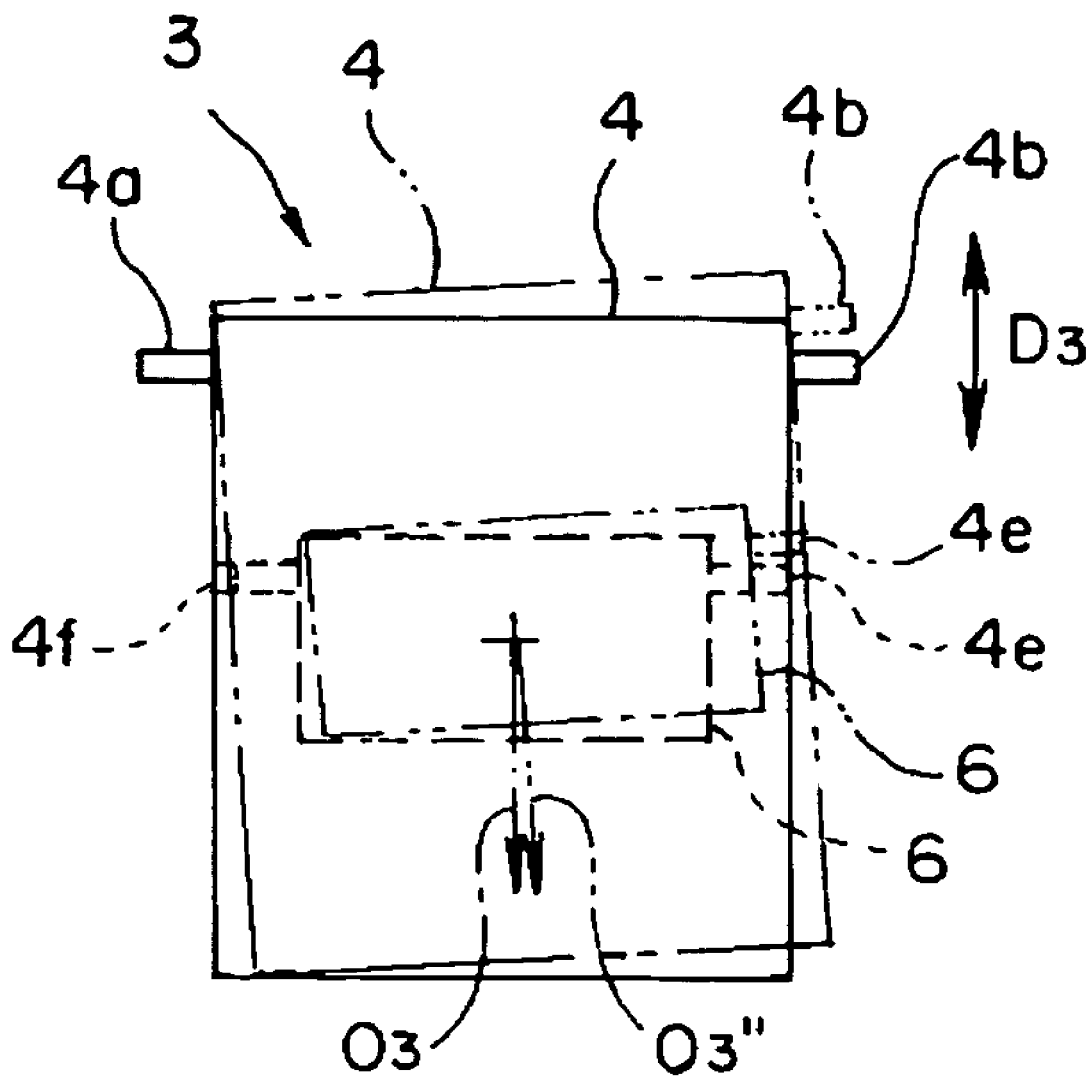
FIG. 19 is a view, seen from the direction A of FIG. 18, showing a state of change of the distance measurement optical axis in the mirror mechanism when the position of the rotation shaft portion of the main mirror is adjusted.

The mirror angle switching operation and the mirror angle adjustment method of the mirror mechanism 10 will be explained with reference to FIGS. 17 to 19.

Figure 17:
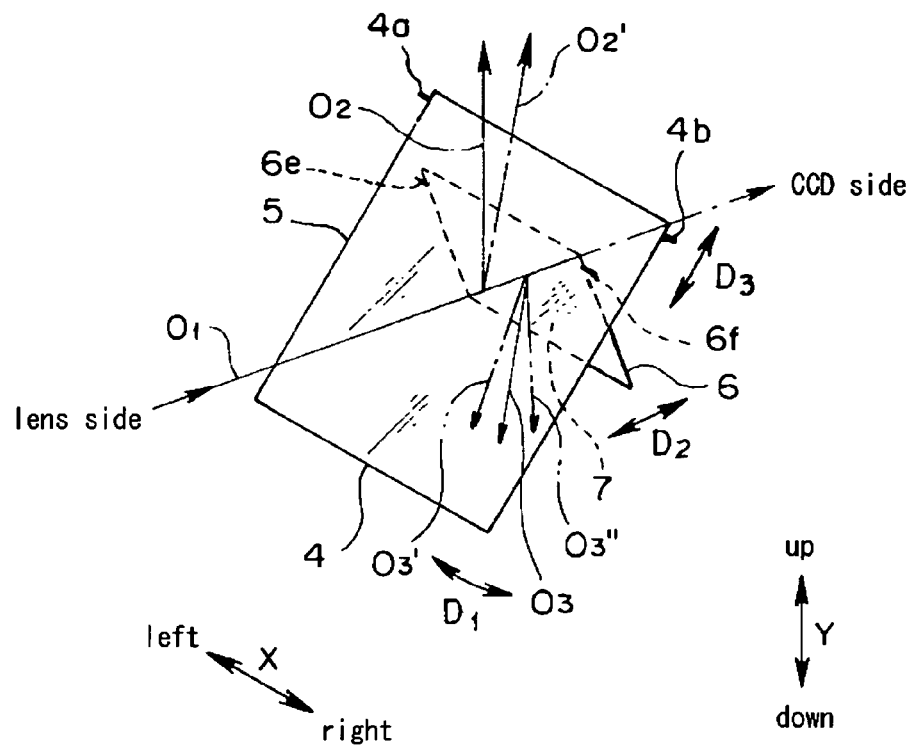
FIG. 17 is a diagrammatic view showing the inclination adjustment state of the viewing optical axis and the distance measurement optical axis of the mirror unit of the mirror mechanism.

FIG. 17 is a diagrammatic view showing the inclination adjustment state of the viewing optical axis O2 and the distance measurement optical axis O3 of the mirror unit of the mirror mechanism. FIG. 18 is a diagrammatic side view showing switching of angles of the main mirror and the sub-mirror of the mirror mechanism. FIG. 19 is a view, seen from the direction A of FIG. 18, showing a state of change of the distance measurement optical axis O3 in the mirror mechanism when the position of the rotation shaft portion of the main mirror is adjusted.

When the mirror unit 3 of the mirror mechanism 10 is in the viewing state, the mirror unit 3 is rotated in the counterclockwise (FIGS. 1 and 4) by the driven end portion 9b of the mirror charge lever 9 being pushed by the charge driving unit 36 (FIG. 4). In this state, the mirror charge driving surface 9c of the lever 9 is rotated to the downward position, and the projection 4c of the main mirror frame 4 and the mirror charge driving surface 9c are separated from each other. The main mirror frame 4 and the main mirror 5 rotate in the clockwise direction (with respect to the view point of FIG. 4) by the urging force of the mirror-down spring 13, and the movement is restricted by the main mirror adjustment pin 18 contacting the main mirror frame 4, thereby the main mirror frame 4 and the main mirror 5 are positioned in the viewing position (mirror-down position) 4B with the inclination of 45 degrees in the photographing optical path.

On the other hand, when the sub-mirror frame 6 and the sub-mirror 7 move on the photographing optical path along with the main mirror frame 4, the projection 6c is driven by the cam portion 8e of the mirror adjustment plate 8, and thus the sub-mirror frame 6 and the sub-mirror 7 rotate in the clockwise direction relative to the main mirror frame 4 and placed in the open position (the distance measurement position) (FIG. 18). In this open state, the position of the sub-mirror frame 6 is decided in a state that the sub-mirror frame 6 contacts the sub-mirror adjustment pin 19 by receiving the urging force of the sub-mirror spring 16.

In the above mentioned viewing state of the mirror unit 3, the photographing light beam from the photographing lens is reflected by the main mirror 5 to the direction of the viewing optical axis O2, as a viewing light beam, and forms an image on the focus plate 39 arranged in the upper portion of the mirror box 1. A part of the photographing light beam passes through the half mirror portion of the main mirror 5, as a distance measurement light beam, and is reflected by the sub-mirror 7 in the open position along the distance measurement optical axis O3, then made incident to the light reception portion of the AF unit 38.

Subsequently, when exposure of the CCD 40 for photographing is performed, the driven end portion 9b of the mirror charge lever 9 is released in accordance with the rotation of the driving cam portion of the charge driving unit 36, and the mirror charge lever 9 rotates in the clockwise direction (with respect to the view point of FIG. 4) by the pressing force from the mirror-up spring 12. By the rotation of the mirror charge lever 9, the projection 4c of the main mirror frame 4 is pressed by the mirror charge driving surface 9c, the main mirror frame 4 rotates in the counterclockwise (with respect to the view point of FIG. 4) to the mirror-up direction, centering around the rotation shaft portions 4a and 4b, then moves to the retraction position 4A (the mirror-up position) retracted from the photographing optical path (FIG. 18). The retraction position of the main mirror frame 4 is determined by the abutment of the mirror charge lever 9 on the stopper 1f of the mirror box 1.

When the main mirror frame 4 rotates to the retraction position, the projection 6c of the sub-mirror frame 6 is driven by the cam portion 8e of the mirror adjustment plate 8, and then the sub-mirror frame 6 rotates to the folded position 6A retracted from the photographing optical path from the open position of the viewing state. In the folded state, the sub-mirror 6 is kept in the folded position by receiving the inverted rotational urging force of the sub-mirror spring 16.

Next, a mirror inclination angle adjustment method of the mirror unit 3 will be explained. First, the mirror unit 3 is set in the viewing state (the main mirror 5 is set in the viewing position). In this state, the rear abutting portion 4h (FIG. 8) of the main mirror frame 4 contacts the circumference of the head portion 18c of the main mirror adjustment pin 18 by the urging force of the mirror-down spring 13 (FIG. 18). In the abutting state, when the adjustment pin 18 is adjusted by the hexagonal hole 18a by rotating the adjustment pin 18, the main mirror frame 4 (the reflection surface of the main mirror) slightly rotates to the direction of D1. In the rotation, the inclination angle in the surface including the photographing optical axis O1, that is, the inclination of the viewing optical axis O2, O2', is adjusted to be 45 degrees to the optical axis O1.

After performing the main mirror adjustment described above and the sub-mirror adjustment to be described later, the stem portion 18b is adhered to the wall portion of the mirror box 1 to fix the position of the main mirror adjustment pin 18.

After the adjustment of the inclination of the main mirror frame 4, the mirror adjustment plate 8 is slightly moved along the guide pins 1i and 1j. Then, the rotation shaft portion 4b of the main mirror frame 4 is moved together with the mirror adjustment plate 8 to the direction of D3 along the reflection surface of the main mirror 5 without changing the inclination of the reflection surface. By the movement of the rotation shaft portion 4b, the sub-mirror 7 of the sub-mirror frame 6 supported by the main mirror frame 4 slightly rotates, centering around the axis which passes through the end portion of the other rotation shaft portion 4a and is parallel to the axis orthogonal to the reflection surface of the main mirror, so the left and right component in the direction of the distance measurement optical axis O3 changes, and the inclination O3" is adjusted to match the center in the left and right of the light receiving portion of the AF unit 38 (FIG. 19). After adjusting the sub-mirror, the screw 42 is tightened to the screw hole 1h through the washer 43 to fix the mirror adjustment plate 8.

If the force for maintaining the fixation of the mirror adjustment plate 8 by the screw 42 is not sufficient, it is possible to use two screws which are inserted into the screw insertion through-holes 8g and 8h of the mirror adjustment plate 8 and screwed in the screw holes 1k and 1n to fix thereof, in order to fix the mirror plate 8 more securely.

In the above-mentioned viewing state of the mirror unit 3, the rear abutting portion 6e (FIG. 8) of the sub mirror frame 6 contacts the circumference of the sub-mirror adjustment pin 19 of the mirror adjustment plate 8 by the urging force of the sub-mirror spring 16 (FIG. 18). In the abutting state, when the adjustment pin 19 is adjusted by the hexagonal hole 19a by rotating the adjustment pin 19 (FIG. 5), a relative inclination angle of the sub-mirror frame 6 (the reflection surface of the sub-mirror 7) to the main mirror 5 centered around the horizontal axis orthogonal to the photographing optical axis O1, that is, the inclination O3' of the front and rear direction of the distance measurement optical axis O3, changes (FIGS. 17 and 18). By this adjustment, the inclination O3" is matched to the center in the front and rear direction of the light receiving surface of the AF unit 38. Then, the stem portion of adjustment pin 19 is adhered to the mirror adjustment plate 8 to fix the position of the adjustment pin 19.

By the above mentioned adjustment operation, the angle of the viewing optical axis O2 and the distance measurement optical axis O3 of the mirror unit 3 in the mirror mechanism 10 can be adjusted, and then it is possible to switch between the two states, one is the state in which the subject image viewing from the finder of the mirror unit 3, and the distance measurement of the subject by the AF unit are possible, and the other is the state in which photographing by the CCD 40 is possible.

As mentioned above, according to the mirror angle adjustment mechanism in the mirror mechanism 10 of the present embodiment, when the mirror unit 3 is in the viewing state, the inclination angle of the main mirror 5 to the photographing optical axis O1 (the direction of the viewing optical axis O2) can be adjusted by adjusting the position of the main mirror adjustment pin 18 by rotating the same. Furthermore, with regard to the inclination angle of the sub-mirror 7 to the optical axis O1 (the direction of the distance measurement optical axis O3), the inclination of the sub-mirror 7 relative to the main mirror 5 can be adjusted separately from the adjustment of the angle of the main mirror 5, by adjusting the position of the mirror adjustment plate 8 and adjusting the position of the sub-mirror adjustment pin 19 by rotating the same. Especially, during the adjustment of the position of the mirror adjustment plate 8, the inclination in the right and left direction of the sub-mirror 7 can be changed by moving one of the rotation axes of the main mirror frame to the direction along the reflection surface of the main mirror 5, without changing the inclination angle of the main mirror 5 to the photographing optical axis O1. Thereby, the adjustment operation is easy and it is possible to perform adjustment of good accuracy. Furthermore, tools for adjustment are not necessary.

Also, as mentioned above, since the adjustment accuracy of the inclination angle of the sub-mirror 7 is good, it is possible to set an AF distance measurement area to the subject more accurately, and the measurement of good accuracy can be performed even to distance measurement areas of plural-points distance measurement.

The mirror angle adjustment mechanism according to the present invention is a mirror angle adjustment mechanism including at least two reflection mirrors, adjustment of the angle of each mirror is easy, and tools for adjustment are not always necessary.

While there has been shown and described what are considered to be a preferred embodiment of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A mirror angle adjustment mechanism comprising:
a rotation shaft;
a fixation member for supporting, swingably, one end of the rotation shaft;
an adjustment member for movably supporting the other end of the rotation shaft;
a first reflection mirror which is a plane mirror movable between a first position and a second position different from the first position by rotation around the rotation shaft;
a second reflection mirror rotatably provided on the first reflection mirror; and
a guide mechanism allowing the adjustment member to move in a direction of a surface of the first reflection mirror with respect to the fixation member in order to adjust an angle of the second reflection mirror when the first reflection mirror is in the first position.

2. The mirror angle adjustment mechanism according to claim 1, wherein an axis of the rotation shaft of the second reflection mirror is parallel to an axis of the rotation shaft of the first reflection mirror.

3. The mirror angle adjustment mechanism according to claim 1, wherein the mirror angle adjustment mechanism is used for a single-lens reflex camera,
wherein the first reflection mirror is a main reflection mirror of a finder optical system,
wherein the first position of the first reflection mirror is a position for viewing a finder,
wherein the second reflection mirror is a sub-reflection mirror for distance measurement, and
wherein an angle of the second reflection mirror relative to the main reflection mirror is adjusted when the first reflection mirror is in the position for viewing a finder.

4. The mirror angle adjustment mechanism according to claim 1, wherein the guide mechanism includes a pair of elongated holes and a pair of pin portions respectively fitted in the elongated holes provided between the adjustment member and the fixation member.

5. The mirror angle adjustment mechanism according to claim 1, wherein a second reflection mirror abutting member is provided for positioning the second reflection mirror at a predetermined position when the first reflection mirror is in the first position, the second reflection mirror abutting member being arranged on the adjustment member.

6. The mirror angle adjustment mechanism according to claim 1, further comprising a second reflection mirror abutting member for adjusting a relative angle between the second reflection mirror and the first reflection mirror when the first reflection mirror is in the first position, the second reflection mirror abutting member being movably arranged with respect to the adjustment member.

7. The mirror angle adjustment mechanism according to claim 1, wherein the fixation member includes a first reflection mirror abutting member provided movably on the fixation member used for adjusting an angle of the first reflection mirror when the first reflection mirror is in the first position.

8. A single-lens reflex camera comprising:
a viewing optical system;
a rotation shaft;
a fixation member for supporting, swingably, one end of the rotation shaft;
a first reflection mirror which is a plane mirror movable by rotation around the rotation shaft between a first position in which a subject light beam from a capturing lens is guided to the viewing optical system and a second position;
a second reflection mirror rotatably provided on the first reflection mirror; and
an adjustment member allowing the other end of the rotation shaft to move in a direction of a surface of the first reflection mirror with respect to the fixation member, in order to adjust an angle of the second reflection mirror relative to the first reflection mirror when the first reflection mirror is in the first position.

9. The single-lens reflex camera according to claim 8, wherein an axis of the rotation shaft of the second reflection mirror is parallel to an axis of the rotation shaft of the first reflection mirror.

10. The single-lens reflex camera according to claim 8, wherein a pair of elongated holes and a pair of pin portions respectively fitted in the elongated holes are provided between the adjustment member and the fixation member.

11. The single-lens reflex camera according to claim 10, wherein the pair of elongated holes is provided in the adjustment member, and the pair of pin portions is provided on the fixation member.

12. The single-lens reflex camera according to claim 8, wherein a second reflection mirror abutting member is provided for positioning the second reflection mirror at a predetermined position when the first reflection mirror is in the first position, the second reflection mirror abutting member being provided on the adjustment member.

13. The single-lens reflex camera according to claim 8, further comprising a second reflection mirror abutting member for adjusting a relative angle between the second reflection mirror and the first reflection mirror when the first reflection mirror is in the first position, the second reflection mirror abutting member being movably arranged on the adjustment member.

14. The single-lens reflex camera according to claim 8, wherein the fixation member includes a first reflection mirror abutting member provided movably with respect to the fixation member in order to adjust an angle of the first reflection mirror when the first reflection mirror is in the first position.

15. A mirror angle adjustment mechanism comprising:
a rotation shaft;
a fixation member for supporting one end of the rotation shaft;
an adjustment member for movably supporting the other end of the rotation shaft;
a first reflection mirror which is a plane mirror movable between a first position and a second position different from the first position by rotation around the rotation shaft;
a second reflection mirror rotatably provided on the first reflection mirror;
a guide mechanism allowing the adjustment member to move in a direction of a surface of the first reflection mirror with respect to the fixation member in order to adjust an angle of the second reflection mirror when the first reflection mirror is in the first position, and
wherein the guide mechanism includes a pair of elongated holes and a pair of pin portions respectively fitted in the elongated holes provided between the adjustment member and the fixation member.

16. A single-lens reflex camera comprising:
a viewing optical system;
a rotation shaft;
a fixation member for supporting one end of the rotation shaft;
a first reflection mirror which is a plane mirror movable by rotation around the rotation shaft between a first position in which a subject light beam from a capturing lens is guided to the viewing optical system and a second position;
a second reflection mirror rotatably provided on the first reflection mirror;
an adjustment member allowing the other end of the rotation shaft to move in a direction of a surface of the first reflection mirror with respect to the fixation member, in order to adjust an angle of the second reflection mirror relative to the first reflection mirror when the first reflection mirror is in the first position, and
wherein a pair of elongated holes and a pair of pin portions respectively fitted in the elongated holes are provided between the adjustment member and the fixation member.

* * * * *